US012769932B2

(12) United States Patent
Jain et al.

(10) Patent No.: US 12,769,932 B2
(45) Date of Patent: Oct. 20, 2026

(54) VISION-BASED GENERATION OF NAVIGATION WORKFLOW FOR AUTOMATICALLY FILLING APPLICATION FORMS USING LARGE LANGUAGE MODELS

(71) Applicant: Tata Consultancy Services Limited, Mumbai (IN)

(72) Inventors: Arushi Jain, New Delhi (IN); Shubham Singh Paliwal, New Delhi (IN); Monika Sharma, New Delhi (IN); Lovekesh Vig, New Delhi (IN); Gautam Shroff, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 258 days.

(21) Appl. No.: 18/883,765

(22) Filed: Sep. 12, 2024

(65) Prior Publication Data

US 2025/0131185 A1 Apr. 24, 2025

(30) Foreign Application Priority Data

Oct. 20, 2023 (IN) ............................ 202321071960

(51) Int. Cl.
*G06F 40/174* (2020.01)
*G06F 40/106* (2020.01)
*G06V 30/412* (2022.01)

(52) U.S. Cl.
CPC .......... *G06F 40/174* (2020.01); *G06F 40/106* (2020.01); *G06V 30/412* (2022.01)

(58) Field of Classification Search
CPC .... G06F 40/174; G06F 40/106; G06V 30/412
See application file for complete search history.

(56) References Cited

U.S. PATENT DOCUMENTS 11,526,367 B1 * 12/2022 Nair ...................... G06F 40/197
2008/0313529 A1 * 12/2008 Gwozdz ................ G06F 40/174
715/224

(Continued)

FOREIGN PATENT DOCUMENTS

WO 2022081377 A1 4/2022

OTHER PUBLICATIONS

Gavrilovskaya, N V et al., "Developing a robot with computer vision for automating business processes of the industrial complex", Title of the item: Journal of Physics: Conference Series, Date: 2021, Publisher: IOP Publishing Link: https://iopscience.iop.org/article/10.1088/1742-6596/1889/2/022024/pdf.

*Primary Examiner* — Anil K Bhargava
(74) *Attorney, Agent, or Firm* — Finnegan, Henderson, Farabow, Garrett & Dunner, LLP

(57) ABSTRACT

Robotic Process Automation (RPA) systems face challenges in handling complex processes and diverse screen layouts that require advanced human-like decision-making capabilities. These systems typically rely on pixel-level encoding through drag-and-drop or automation frameworks such as Selenium to create navigation workflows, rather than visual understanding of screen elements. Present disclosure provides systems and methods that implement large language models (LLMs) coupled with deep learning based image understanding which adapt to new scenarios, including changes in user interface and variations in input data, without the need for human intervention. System of the present disclosure uses computer vision and natural language processing to perceive visible elements on graphical user interface (GUI) and convert them into a textual representation. This information is then utilized by LLMs to generate one or more navigation workflows that include a (Continued)

sequence of actions that are executed by a scripting engine/code to complete an assigned task from a task-request.

18 Claims, 5 Drawing Sheets

(56) References Cited

U.S. PATENT DOCUMENTS

| | | | | |
|---|---|---|---|---|
| 2016/0019197 | A1* | 1/2016 | Iasi | G06F 40/174<br>715/224 |
| 2021/0182547 | A1* | 6/2021 | Ayyadevara | G06V 10/82 |
| 2021/0279411 | A1* | 9/2021 | Hecht | G06F 40/174 |
| 2022/0113991 | A1* | 4/2022 | Singh | G06F 9/451 |
| 2023/0107175 | A1* | 4/2023 | Braga | G06F 40/174<br>705/3 |
| 2023/0108015 | A1* | 4/2023 | Mayer | G06F 40/30<br>704/9 |
| 2023/0206671 | A1* | 6/2023 | Lanin | G06V 30/412<br>382/175 |
| 2023/0230406 | A1* | 7/2023 | Mehra | G06F 40/174<br>382/175 |

* cited by examiner

VISION-BASED GENERATION OF NAVIGATION WORKFLOW FOR AUTOMATICALLY FILLING APPLICATION FORMS USING LARGE LANGUAGE MODELS

PRIORITY CLAIM

This U.S. patent application claims priority under 35 U.S.C. § 119 to: Indian Patent Application number 202321071960, filed on Oct. 20, 2023. The entire contents of the aforementioned application are incorporated herein by reference.

TECHNICAL FIELD

The disclosure herein generally relates to vision-based techniques and robot process automation, and, more particularly, to vision-based generation of navigation workflow for automatically filling application forms using large language models.

BACKGROUND

Current Robotic Process Automation (RPA) systems have inherent limitations concerning decision-making, language comprehension, and visual capabilities, as they are designed to adhere to pre-defined rules and workflows using pixel-level encoding of the graphical user interface (GUI). These functionalities are typically implemented through drag-and-drop interfaces, screenplay recording, or automation frameworks such as Selenium. Consequently, these systems lack flexibility in adapting to changes in the user interface (UI) and struggle to handle tasks that require intricate visual analysis and natural language understanding.

SUMMARY

Embodiments of the present disclosure present technological improvements as solutions to one or more of the above-mentioned technical problems recognized by the inventors in conventional systems.

For example, in one aspect, there is provided a processor implemented method for vision-based generation of navigation workflow for automatically filling application forms using large language models. The method comprises receiving, via one or more hardware processors, an input metadata pertaining to an application form, wherein the input metadata comprises a layout mapping of the application form, and a location of the application form; extracting, by using at least one of one or more vision-based techniques and one or more Large language Models (LLMs) via the one or more hardware processors, one or more field names, and one or more associated field types from the application form; merging, by using the one or more LLMs via the one or more hardware processors, the one or more field names, and the one or more associated field types with the layout mapping to obtain a mapping list, wherein the mapping list further comprises one or more coordinates associated with the one or more field names, and the one or more associated field types; and generating, by using the one or more LLMs via the one or more hardware processors, a navigation workflow using the mapping list and a task-request obtained from a user, wherein the navigation workflow comprises a sequence of actions for execution of one or more micro-level steps comprised therein and the task-request for handling of the one or more associated field types using one or more screenshots associated with the application form via the one or more vision-based techniques.

In an embodiment, the mapping list serves as a textual representation of a visual screen associated with the application form for generating the navigation workflow.

In an embodiment, the task-request comprises information to be populated in one or more fields associated with the one or more field names of the application form.

In an embodiment, the method further comprises extracting, by using a frame difference technique via the one or more hardware processors, one or more feedback messages related to one or more statuses encountered during the execution of the task request.

In an embodiment, the layout mapping is generated using at least one of a rule-based approach, a virtual grid approach, and a demonstration of filling of an application form with relevant information.

In an embodiment, accuracy of the layout mapping is determined based on an algorithmic analysis of one or more filled portions and one or more unfilled portions of the application form, and wherein the algorithmic analysis establishes one or more connections between the one or more field names, one or more placeholders, and one or more associated field values.

In another aspect, there is provided a processor implemented system for vision-based generation of navigation workflow for automatically filling application forms using large language models. The system comprises: a memory storing instructions; one or more communication interfaces; and one or more hardware processors coupled to the memory via the one or more communication interfaces, wherein the one or more hardware processors are configured by the instructions to: receive an input metadata pertaining to an application form, wherein the input metadata comprises a layout mapping of the application form, and a location of the application form; extract, by using at least one of one or more vision-based techniques and one or more Large language Models (LLMs), one or more field names, and one or more associated field types from the application form; merge, by using the one or more LLMs s, the one or more field names, and the one or more associated field types with the layout mapping to obtain a mapping list, wherein the mapping list further comprises one or more coordinates associated with the one or more field names, and the one or more associated field types; and generate, by using the one or more LLMs, a navigation workflow using the mapping list and a task-request obtained from a user, wherein the navigation workflow comprises a sequence of actions for execution of one or more micro-level steps comprised therein and the task-request for handling of the one or more associated field types using one or more screenshots associated with the application form via the one or more vision-based techniques.

In an embodiment, the mapping list serves as a textual representation of a visual screen associated with the application form for generating the navigation workflow.

In an embodiment, the task-request comprises information to be populated in one or more fields associated with the one or more field names of the application form.

In an embodiment, the one or more hardware processors are further configured by the instructions to extract, by using a frame difference technique, one or more feedback messages related to one or more statuses encountered during the execution of the task request.

In an embodiment, the layout mapping is generated using at least one of a rule-based approach, a virtual grid approach, and a demonstration of filling of an application form with relevant information.

In an embodiment, accuracy of the layout mapping is determined based on an algorithmic analysis of one or more filled portions and one or more unfilled portions of the application form, and wherein the algorithmic analysis establishes one or more connections between the one or more field names, one or more placeholders, and one or more associated field values.

In yet another aspect, there are provided one or more non-transitory machine-readable information storage mediums comprising one or more instructions which when executed by one or more hardware processors cause vision based generation of navigation workflow for automatically filling application forms using large language models by receiving an input metadata pertaining to an application form, wherein the input metadata comprises a layout mapping of the application form, and a location of the application form; extracting, by using at least one of one or more vision-based techniques and one or more Large language Models (LLMs), one or more field names, and one or more associated field types from the application form; merging, by using the one or more LLMs, the one or more field names, and the one or more associated field types with the layout mapping to obtain a mapping list, wherein the mapping list further comprises one or more coordinates associated with the one or more field names, and the one or more associated field types; and generating, by using the one or more LLMs, a navigation workflow using the mapping list and a task-request obtained from a user, wherein the navigation workflow comprises a sequence of actions for execution of one or more micro-level steps comprised therein and the task-request for handling of the one or more associated field types using one or more screenshots associated with the application form via the one or more vision-based techniques.

In an embodiment, the mapping list serves as a textual representation of a visual screen associated with the application form for generating the navigation workflow.

In an embodiment, the task-request comprises information to be populated in one or more fields associated with the one or more field names of the application form.

In an embodiment, the one or more instructions which when executed by the one or more hardware processors further cause extracting, by using a frame difference technique, one or more feedback messages related to one or more statuses encountered during the execution of the task request.

In an embodiment, the layout mapping is generated using at least one of a rule-based approach, a virtual grid approach, and a demonstration of filling of an application form with relevant information.

In an embodiment, accuracy of the layout mapping is determined based on an algorithmic analysis of one or more filled portions and one or more unfilled portions of the application form, and wherein the algorithmic analysis establishes one or more connections between the one or more field names, one or more placeholders, and one or more associated field values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
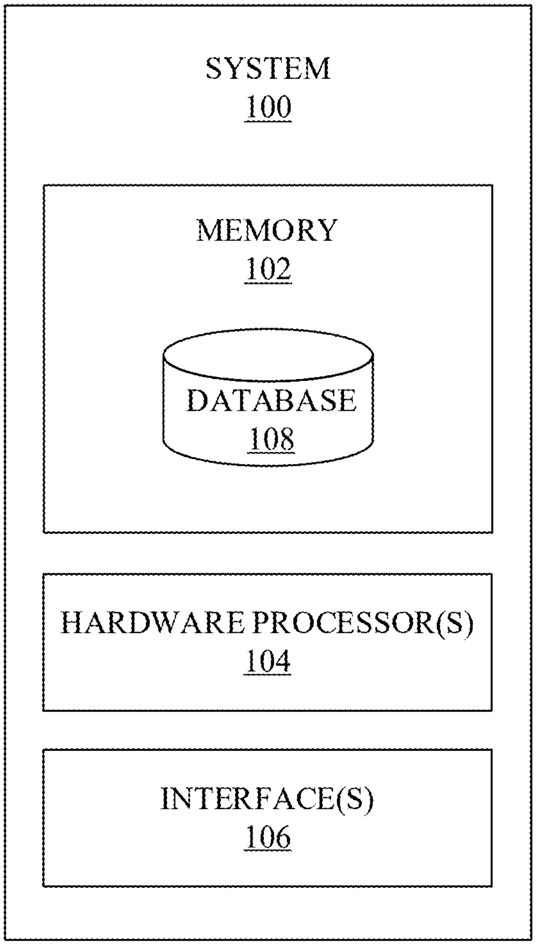
FIG. 1 depicts an exemplary system for vision-based generation of navigation workflow for automatically filling application forms using large language models (LLMs), in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Robotic Process Automation (RPA) has garnered substantial interest as a means of automating repetitive and labor-intensive business processes through software bots. Its adoption spans various industries, including customer service, finance, human resources, supply chain management, and healthcare with the aim of enhancing operational efficiency, minimizing costs and errors, and improving overall customer experience. Despite its popularity, scientific literature on RPA is limited, with existing sources mainly focusing on its features and benefits. Current RPA systems have inherent limitations concerning decision-making, language comprehension, and visual capabilities, as they are designed to adhere to pre-defined rules and workflows using pixel-level encoding of the graphical user interface (GUI). These functionalities are typically implemented through drag-and-drop interfaces, screenplay recording, or automation frameworks such as Selenium as known in the art. Consequently, these systems lack flexibility in adapting to changes in the UI and struggle to handle tasks that require intricate visual analysis and natural language understanding.

Recent years have witnessed remarkable progress in deep learning and computer vision, leading to advancements in object recognition, image segmentation, and video analysis. Additionally, the introduction of pre-trained large language models as known in the art such as GPT-3, ChatGPT, Llama, and PaLM has revolutionized natural language processing, enabling advanced language understanding and generation capabilities. For instance, Artificial Intelligence (AI) agents such as AgentGPT and AutoGPT can automate a wide range of tasks, including writing, translation, and content generation. Moreover, the advent of Visual Language Models (VLMs) such as Control-Net and Visual-ChatGPT, combining text-based LLMs with visual understanding, has opened new avenues for image analysis and processing. While VLMs such as Visual-ChatGPT and Google®'s Bard 3 can perform tasks such as generating images from textual input, providing image descriptions, and answering questions about images, they require fine-tuning on Web GUIs datasets to identify and localize screen elements in application GUIs. Further, the recently announced GPT-4 by OpenAI has received significant attention due to its promising capabilities in handling multimodal data. However, as of now, GPT-4 has not been available to everyone publicly, and its utility and limitations in handling visual data are yet to be evaluated.

These breakthroughs have opened up new possibilities for integrating LLMs with RPA systems towards enabling them to perceive and autonomously interact with complex web applications. For example, Wang et al. (e.g., refer "Bryan Wang, Gang Li, and Yang Li. 2023. Enabling Conversational Interaction with Mobile UI using Large Language Models. arXiv:2209.08655 [cs. HC]") conducted a study exploring the use of pre-trained language models (LLMs) to enable conversational interaction on mobile user interfaces (UIs). Their research involved providing GUIs to LLMs that were pre-trained for natural language understanding, along with employing various techniques to prompt the LLMs to perform conversational tasks. In another study, Pedro et al. (e.g., refer "Pedro Martins, Filipe Sá, Francisco Morgado, and Carlos Cunha. 2020. Using machine learning for cognitive Robotic Process Automation (RPA). In 2020 $15^{th}$ Iberian Conference on Information Systems and Technologies (CISTI). 1-6. https://doi.org/10.23919/CISTI49556.2020.9140440") utilized the Yolo object detector as known in the art to identify screen elements such as menus and buttons. However, the study did not propose a method for determining the necessary actions to complete a specific task based on the identified screen elements. Additionally, the training of the object detector was limited to detecting Eclipse IDE screen elements only, requiring the development of a new detector in case of changes in the application type.

To address the limitations of current RPA systems, methods of the present disclosure implement an AI-based RPA system (also referred to as 'system' and interchangeably used herein) that uses LLMs coupled with deep-learning based image understanding. It integrates vision capabilities with natural language processing techniques to adapt to changes in the graphical user interface (GUI) and automatically generate navigation workflows for handling of one or more associated field types of an application form using one or more screenshots associated with the application form. By utilizing vision techniques, the system identifies and locates screen elements, while a HyperText Markup Language (HTML) source code (in the case where the application form is a web application form) provides information about the type of these elements. A pre-trained large language model such as GPT-3 is then employed to generate navigation workflows based on this information. This navigation workflow is then executed using a scripting engine to complete the assigned task. One notable benefit of the system of the present disclosure is its ability to handle diverse application layouts and screen resolutions efficiently. Thus, the system and method of the present disclosure are capable of autonomously executing user-assigned tasks. More specifically, as mentioned above, the system leverages visual and natural language understanding and optionally HTML code (in case of web application form) to interpret the layout mapping. This includes associating field names, their types, and corresponding placeholders/edit fields. The system is designed to be adaptable to GUI changes and handle complex tasks effectively. It achieves this by generating navigation workflows using vision and large language models (LLMs), without relying on predefined pixel-encoded rule-based workflows. The system's proficiency in handling multipage form submission applications with diverse field types, such as date pickers, dropdown menus, etc. is demonstrated through the use of vision-based algorithms as described herein below. Further, to demonstrate the effectiveness of the system 100, a dataset called RPA-Dataset, containing generic web applications with various layouts was curated.

Moreover, the objective of the system and method of the present disclosure is to automate the generation of navigation workflows for specific tasks within a graphical user interface (GUI) application. Using deep-vision and natural language understanding, the system and method of the present disclosure identify screen elements such as field names, placeholders/edit fields, and hints. Subsequently, one or more LLMs are used to determine the necessary actions to fill in the required information which are then executed using a scripting engine. Finally, the system also extracts feedback messages and provides updates on the status of the executed task.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 depicts an exemplary system 100 for vision-based generation of navigation workflow for automatically filling application forms using large language models, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to application forms (e.g., offline application form, online/web application form), associated fields/field names, associated field types, and the like. The database 108 further comprises layout mapping of the application forms, and a location of the application forms, mapping list generated for the application forms, and the like. The memory 102 comprises one or more large language models (LLMs), and/or deep learning (DL) models, which when trained using available dataset perform the method of the present disclosure. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
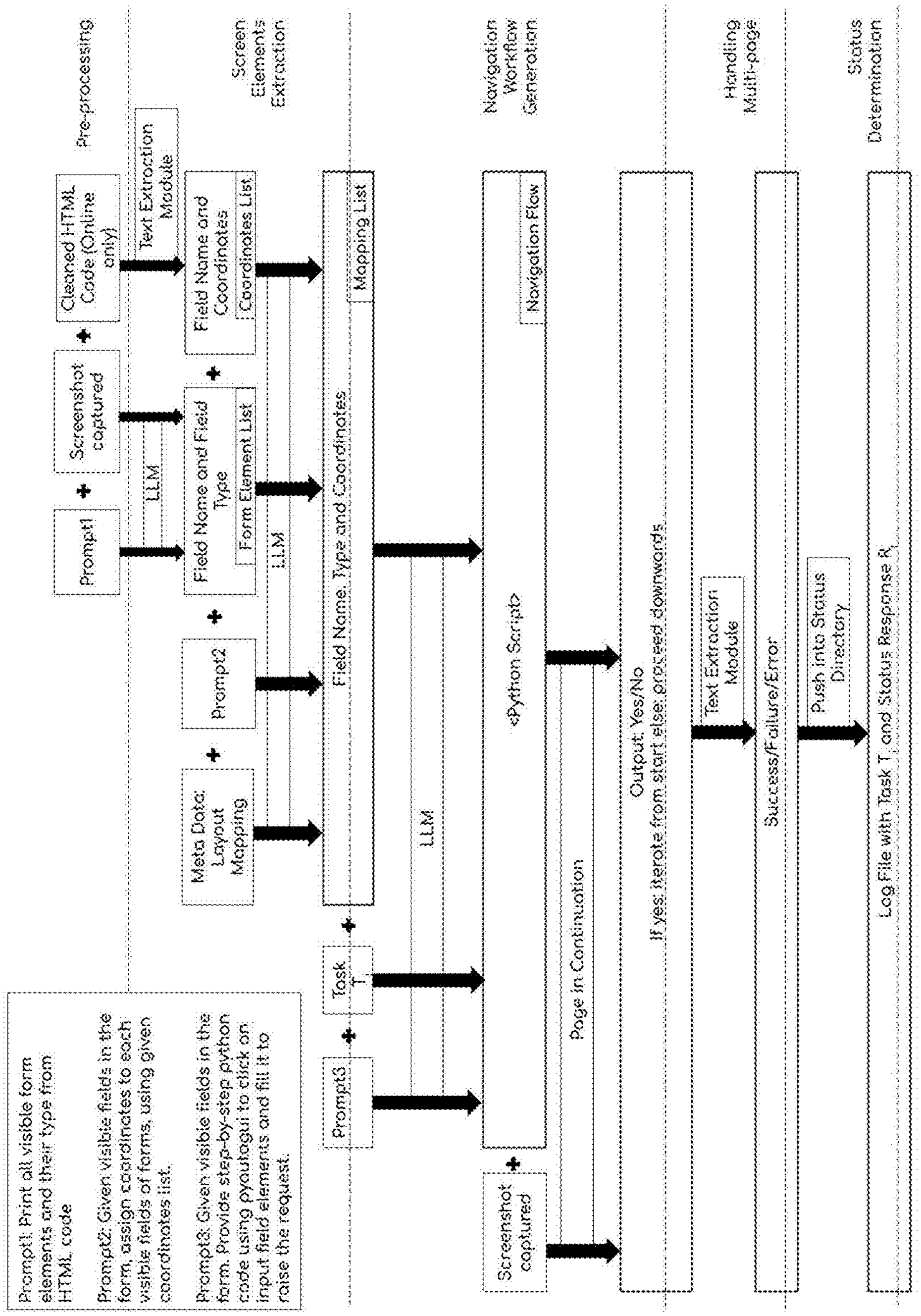
FIG. 2 depicts an exemplary high-level pipeline of the system of FIG. 1 for vision-based generation of navigation workflow for automatically filling application forms using large language models, in accordance with an embodiment of the present disclosure.

FIG. 2, with reference to FIG. 1, depicts an exemplary high-level pipeline of the system 100 of FIG. 1 for vision-based generation of navigation workflow for automatically filling application forms using large language models, in accordance with an embodiment of the present disclosure.

Figure 3:
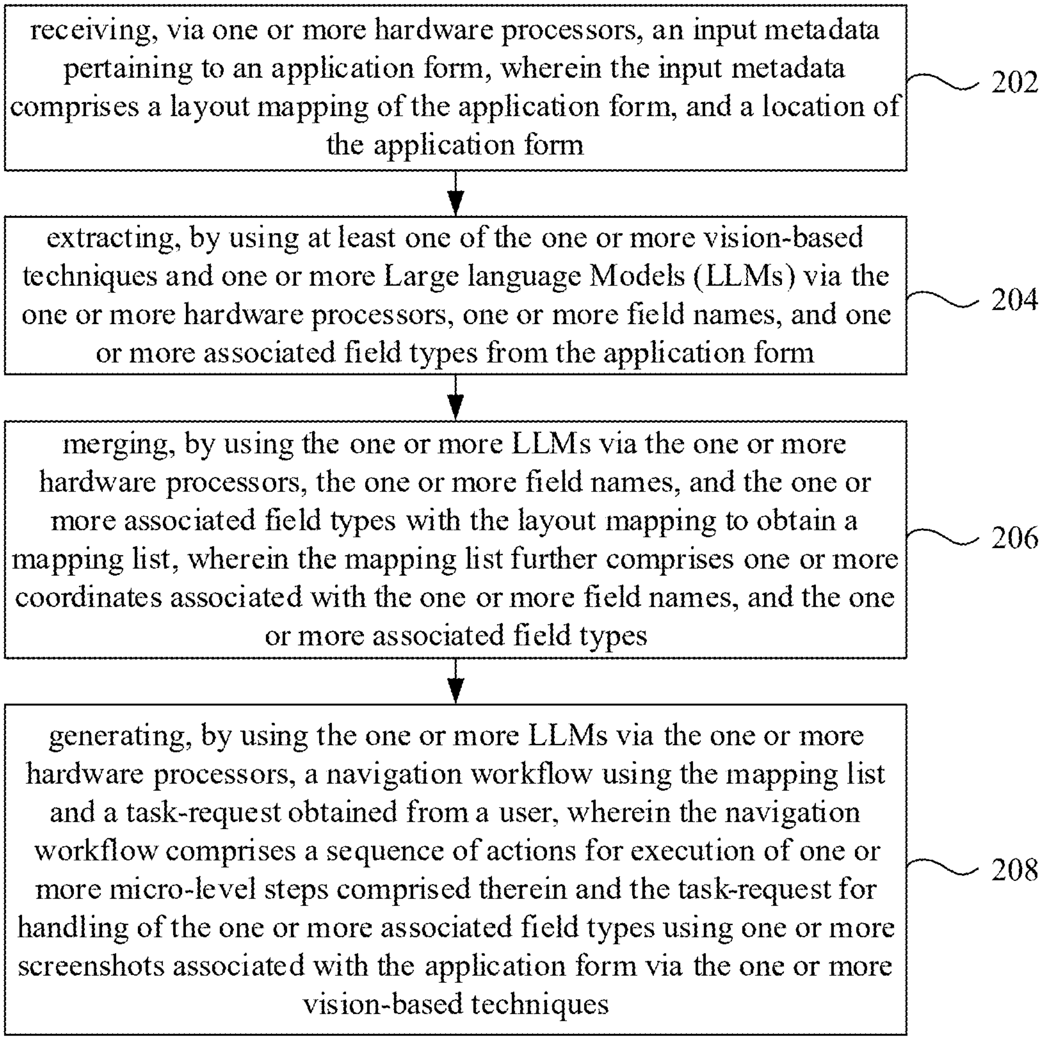
FIG. 3 depicts an exemplary flow chart illustrating a method for vision-based generation of navigation workflow for automatically filling application forms using large language models, using the system of FIG. 1, in accordance with an embodiment of the present disclosure.

FIG. 3, with reference to FIGS. 1 through 2, depicts an exemplary flow chart illustrating a method for vision-based generation of navigation workflow for automatically filling application forms using large language models, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the exemplary high-level pipeline of the system 100 depicted in FIG. 2, and the flow diagram as depicted in FIG. 3.

Figure 4:
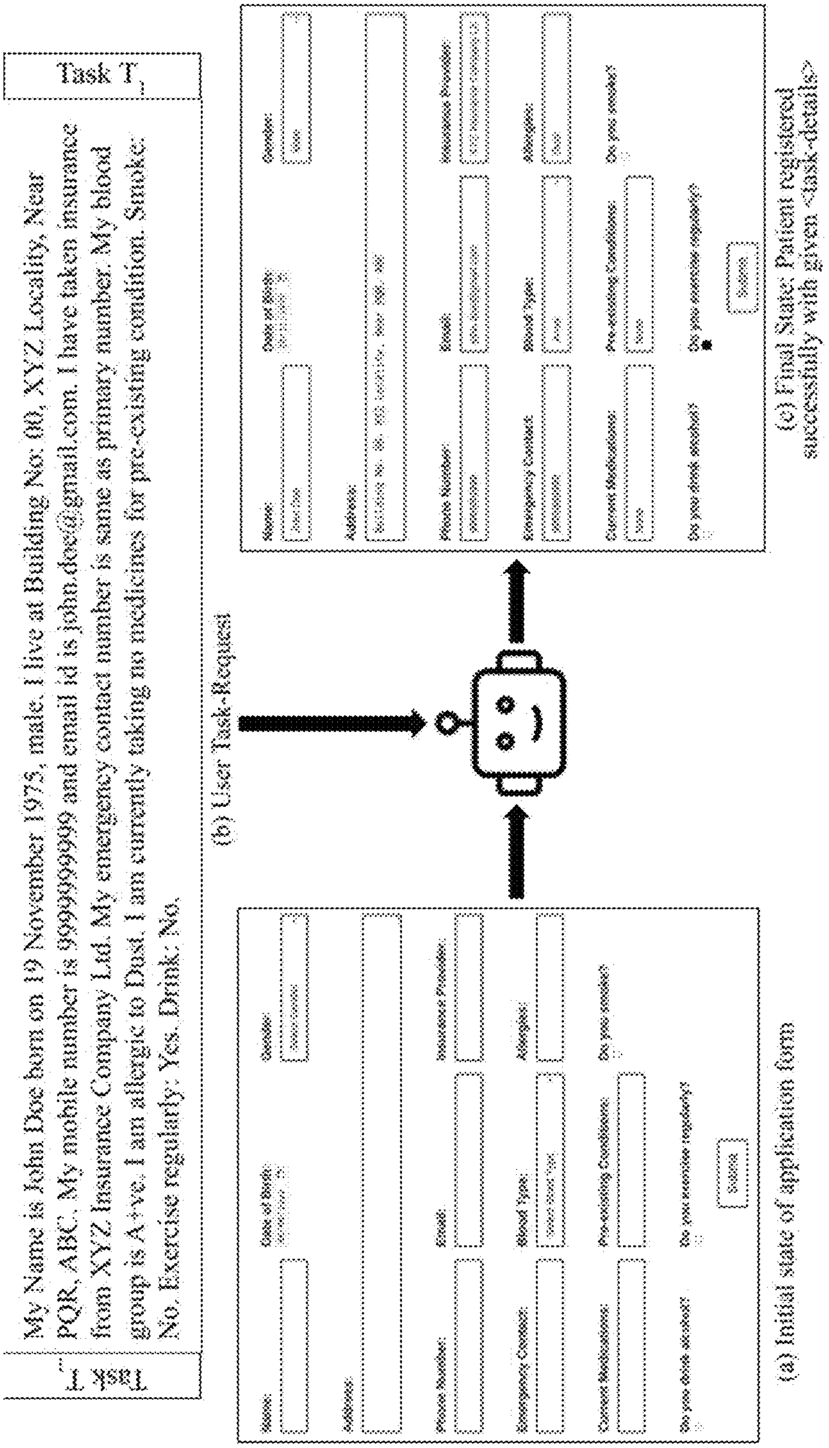
FIG. 4 depicts an exemplary task-request and handling of various field names and field types and automatically populating/filling the application form, in accordance with an embodiment of the present disclosure.

At step 202 of the method of the present disclosure, the one or more hardware processors 104 receive an input metadata pertaining to an application form. The input metadata comprises a layout mapping of the application form, and a location of the application form. For instance, the application form may be an offline application form such as a document (e.g., a word document), an excel/spread sheet, a SharePoint document, an editable Portable Document Format (PDF), and so on. Such an offline application form comprises one or more fields (or field names), and field types. In case of offline application form such as a PDF submission form, the system 100 implements one or more deep learning-based object detection model that can be trained for identifying the field names along with their types. Similarly, the application form may be an online or a web application form having the one or more fields (or field names), and the field types. The application form may be a single page application or having 2 or more pages with or without scroll option capability. The location of the application form can be a uniform resource locator in the case of a web application form or an address or a path to a locally stored application form on a computer system. Additionally, the one or more hardware processors 104 receive one or more task-requests from a user (e.g., a user or an entity such as other than a person/user). The task-requests comprises information to be populated in one or more fields associated with the one or more field names of the application form. For instance, consider the task-request from the user including registering a new patient in the application form (e.g., say in a hospital system/portal/registration form) as depicted in FIG. 4. FIG. 4, with reference to FIGS. 1 through 3, depicts an exemplary task-request and handling of various field names and field types and automatically populating/filling the application form, in accordance with an embodiment of the present disclosure. Traditionally, this process involved manual data entry from a handwritten document. However, this can be automated by digitizing the document using information extraction techniques as known in the art.

Figure 5:
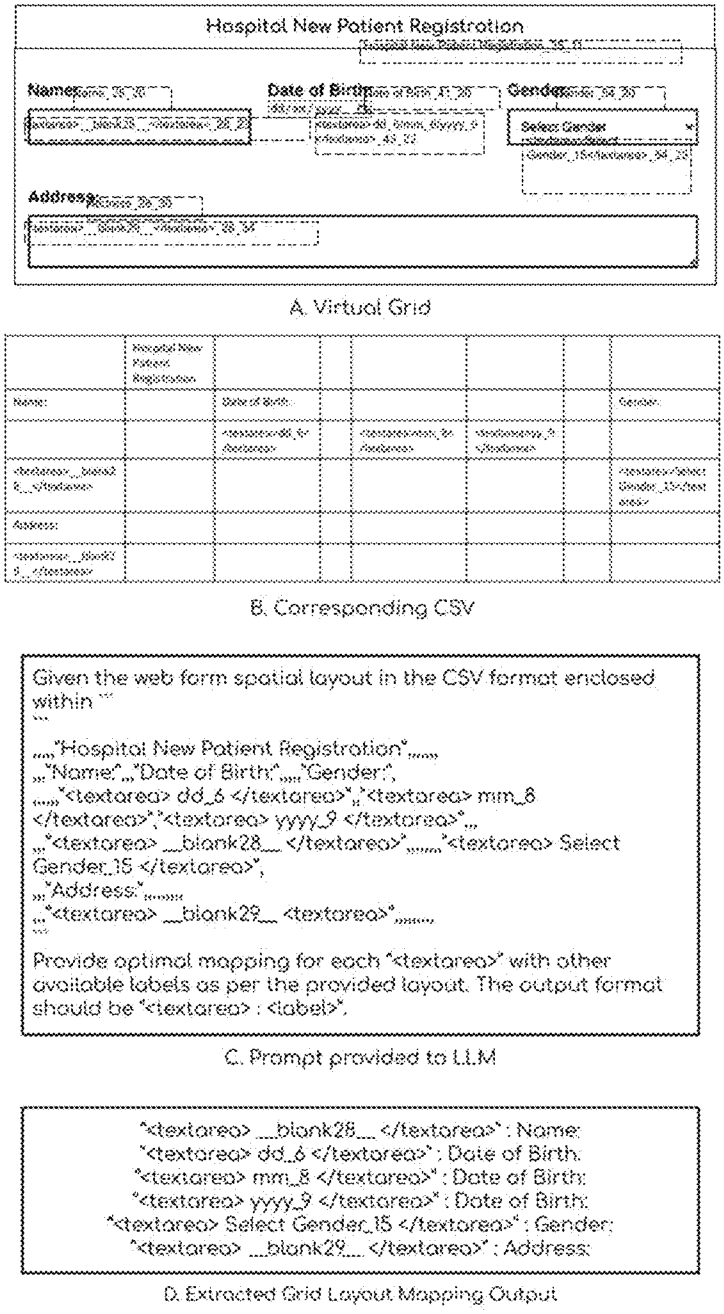
FIG. 5 depicts a layout mapping being generated using the Virtual Grid approach, in accordance with an embodiment of the present disclosure.

In an embodiment, the layout mapping is generated using at least one of a rule-based approach, a virtual grid approach, and a demonstration of filling of an application form with relevant information. Each of the above approaches are described by way of following description:

1) Rule-based approach: After analyzing multiple web application forms, the system 100 and the method of the present disclosure observed a consistent pattern where field names are usually aligned to the left or top of the edit field, while data-hints are commonly positioned at the bottom or right side. Leveraging these observations, the system 100 devised an automated layout mapping technique that combines vision-based methods with predefined rules and heuristics. Below are some of the rules/heuristics generated by/defined in the system 100 and invoked for execution and for generation of the layout mapping.
   a. Rule 1: Associate texts which lie inside the edit boxes.
   b. Rule 2: Sort the edit boxes from top to bottom and left to right.
   c. Rule 3: Linking with labels:
      i. Rule 3(1): For each edit box find the immediate left neighbors
      ii. Rule 3(2): For each edit box find the immediate top neighbors
      iii. Rule 3(3): Condition on the start coordinate of top neighbor: It must start within 'x' distance (e.g., say x=⅓ distance).
   d. Rule 3(4): Condition on the gap between immediate top neighbor and edit box is set as some threshold value. If this distance is greater than this gap, then it cannot be associated.
   e. Rule 4: Linking with hints:
      i. Rule 4(1): For each edit box find the immediate right neighbors
      ii. Rule 4(2): For each edit box find the immediate bottom neighbors
      iii. Rule 4(3): Condition is on distance between the edit box and text, it should be less than 'y' of input box height (e.g., value of y=½).
2) Virtual Grid Approach: Typically, Layout Mapping Models face challenges in interpreting pixel coordinates to comprehend spatial layouts accurately. Hence, the system 100 condenses the original layout by converting pixel coordinates into a virtual grid space, as shown in FIG. 5. More specifically, FIG. 5, with reference to FIGS. 1 through 4, depicts a layout mapping being generated using the Virtual Grid approach, in accordance with an embodiment of the present disclosure. As can be seen from FIG. 5, the Virtual Grid Approach condenses the original layout by converting pixel coordinates into a virtual grid space (A) which is represented in a corresponding Comma Separated Value (CSV) format (B). The text in broken line in (A) represents the Optical Character Recognition (OCR) output along with corresponding grid coordinates. Next, the CSV file is fed into LLM as input with a prompt to give the mapping of field names with the corresponding edit-fields and data-hints (C). The output is the grid layout mapping (D). Each unit in the virtual grid covers multiple pixel blocks, simplifying misalignment checks to eight neighboring cells and reducing the spatial complexity. We represent the spatial layout using .CSV format in virtual grids, which are fed as input to LLM along with a text prompt to generate the layout mapping.

3) Demonstration of filling of an application form with relevant information (e.g., say by a user/administrator): If a rule-based or virtual grid based approach does not yield accurate layout mapping, a demonstration-based approach can be employed. This method involves the administrator providing a demonstration by entering dummy data into the application form (e.g., say an offline application form such as PDF application form, or a web application form (and submitting a JSON file) with relevant field information. Further, the system 100 uses an algorithmic analysis of the filled and unfilled form images/portions, along with the JSON data, to establish connections between field names, placeholders, and values, ensuring 100% accurate layout mapping. In other words, accuracy of the layout mapping is determined based on an algorithmic analysis of one or more filled portions and one or more unfilled portions of the application form. The algorithmic analysis establishes one or more connections between the one or more field names, one or more placeholders, and one or more associated field values, in one example embodiment. The algorithmic analysis includes receiving the ground truth from an administrator, and then the accuracy of the layout mapping is calculated by the system 100 by programmatically comparing the two. In other words, the algorithmic analysis includes manipulated association with the ground truth wherein the ground truth is obtained from a human/an administrator.

It is to be understood by a person having ordinary skill in the art or person skilled in the art that though FIG. 5 depicts the layout mapping generated using the Virtual Grid approach, such layout mapping generation by the Virtual Grid approach shall not be construed as limiting the scope of the present disclosure. For sake of brevity, the layout mapping generation by the Rule-based approach and/or Demonstration of filling of an application form with relevant information (e.g., say by a user/administrator) is not shown, but can be realized in practice.

Referring to steps of FIG. 3, at step 204 of the method of the present disclosure, the one or more hardware processors 104 extract, by using at least one of one or more vision-based techniques and the one or more Large language Models (LLMs) stored in the memory 102 and invoked for execution, one or more field names, and one or more associated field types from the application form using the input metadata. The system 100 and the method of the present disclosure implement the one or more vision-based techniques which are known in the art techniques. The input metadata serves as an input for the one or more LLMs which extract the one or more field names, and the one or more associated field types from the application form. It is to be understood by a person having ordinary skill in the art or person skilled in the art that in case of an online application form or a web application form, the system 100 receives a HyperText Markup Language (HTML) source code associated with the online/web application form. In such case the HTML source code serves as additional data and forms part of the input metadata. Hence, in case the form to be automatically filled is the online/web application form, the input metadata as mentioned above in step 202 and the HTML source code forming part of the input metadata is (or may be) pre-processed wherein the HTML code is cleaned to ensure the system 100 meets the size limit of Large Language Models. This involves removing unnecessary attributes and classes from the HTML source code that could hinder LLM processing. The cleaned/pre-processed HTML source code is input into the one or more LLMs (also referred as trained Large Language Models (LLMs) such as GPT-3 and ChatGPT to extract field names and field types using the prompt as shown in FIG. 2. Meanwhile, a screenshot image of the application form is captured, and text-regions are extracted using information extraction technique and so on (e.g., EasyOCR4, and the like).

At step 206 of the method of the present disclosure, the one or more hardware processors 104 merge, by using the one or more LLMs, the one or more field names, and the one or more associated field types with the layout mapping to obtain a mapping list. The mapping list further comprises one or more coordinates associated with the one or more field names, and the one or more associated field types. The extracted information (e.g., the one or more field names, and the one or more associated field types from the application form) is merged with the layout mapping by giving a text-prompt to the one or more LLMs to create the mapping list, which includes field names (name, date of birth, gender, and so on), field types (e.g., text field, date picker/date/month/year field, and so on), and coordinates (e.g., say (x1,y1), (x2,y2), and so on). This mapping list serves as the textual representation of the visual screen associated with the application form for generating the navigation workflow as described in step 208.

At step 208 of the method of the present disclosure, the one or more hardware processors 104 generate, by using the one or more LLMs, a navigation workflow using the mapping list and a task-request obtained from a user. The navigation workflow comprises a sequence of actions for execution of one or more micro-level steps comprised therein and the task-request for handling of the one or more associated field types using one or more screenshots associated with the application form via the one or more vision-based techniques. The above step of 208 is better understood by way of following description:

The mapping list and the task-request are given as input to the one or more LLMs with a prompt to generate PyAutoGUI code/navigation workflow. This scripting code/engine (or the navigation workflow) determines the sequence of actions, including clicking on the correct form-field, to complete the task-request accurately. The precision is crucial to avoid incorrect form submission. The navigation workflow enables the system 100 to execute the micro-level steps with high accuracy and handles different field types such as date pickers, dropdown menus, radio buttons, and checkboxes using vision-based algorithms/techniques (e.g., techniques as known in the art). In an embodiment, the task-request comprises information to be populated in one or more fields associated with the one or more field names of the application form. Below description illustrates handling of various field types by the system 100:

1) Date pickers: The date pickers are characterized by their diverse and captivating designs and these UI elements pose a unique challenge in the realm of user interaction. In the majority of the layouts encountered, date pickers can be effortlessly populated by simply typing the relevant date. However, in scenarios where manual input is restricted, the system 100 employs an astute strategy to ensure optimal performance. The system 100 intelligently scrolls through the corresponding year section by using PyAutoGUI (e.g., a simulator as known in the art) and visually analyzes the screenshot of the calendar and hence, diligently seeks to match the desired year, adapting its direction based on whether the year lies in the past or future. The system 100 via the above simulator further refines the selection process by meticulously clicking through each subsequent month until the desired month aligns harmoniously. With the calendar now seamlessly set, the system 100 harnesses the power of vision and a simple technique of the calendar calculation to extrapolate the coordinate for each date, thus enabling flawless and accurate selection.

2) Dropdown: The system 100 effectively handles complex dropdown menus that have initially hidden options by leveraging visual processing techniques. When the system 100 encounters a <select> field, the system 100 clicks on the designated area of a dropdown menu, captures a screenshot to eliminate visual discrepancies, and extracts the dropdown options as digital representations using a text extraction module (e.g., text extractor as known in the art). In cases where the desired selection is not immediately visible, the system 100 intelligently scrolls the dropdown panel until it locates the target selection using visual analysis of captured screen, ensuring a smooth and seamless user experience.

3) Radio-buttons/Checkboxes: To handle radio-buttons/checkboxes, the system 100 recognizes that it does not require clicking directly on the checkbox or circle. The system 100 utilizes the text associated with the option for selection. More specifically, the system 100 interacts with available tools such as ChatGPT implemented by the method of the present disclosure to gather the available options and coordinates, and the action of clicking on the desired option from the list is performed.

The above algorithms for handling complex fields are invoked by the one or more LLMs during the generation of the navigation workflow based on their presence in the application form required to be automatically filled with relevant information. They are premised on a comprehensive understanding of the visual aspects of the form and integrate nuanced insights into the behavioral patterns of each field type.

After executing the navigation workflow using the scripting engine (e.g., the scripting engine is stored in the memory 102 and invoked for execution of the method described herein), the system 100 captures one or more subsequent screenshot(s) to handle multi-page forms effectively. By leveraging visual cues from an associated layout (e.g., say application form layout or a website layout in case of a web/online application form), it recognizes the continuation of the form and sequentially processes the user's task-requests to fill in any remaining fields.

Further, the one or more hardware processors 104 are configured by the instructions to extract, by using a frame difference technique, one or more feedback messages related to one or more statuses encountered during the execution of the task request. The frame difference technique is a technique to identify motion of one or more objects (e.g., UI elements in this case associated with the application form). Using this algorithm/technique, the system 100 differentiates an object/UI element moving in the application form. Background subtraction is one of the methods suitable to further improve frame differences thus increasing its effectiveness and precision. The feedback messages, obtained using a text-extractor, can address network connectivity issues, missing fields, and/or successful submissions. By logging these feedback messages into a status queue, the system 100 facilitates analysis and improves the user experience.

The system 100 of the present disclosure is also configured to handle dynamic fields. For such scenarios, an iterative approach is implemented by the system 100 for managing dynamic fields within a website/offline application form, which differ from static fields in that their appearance depends on the values entered in preceding fields. The method of the present disclosure operates by populating one field at a time and capturing screenshot of the current application page status. The system 100 then conducts visual analysis on the captured screenshot to determine the next field to be filled. This involves extracting all form elements, identifying unfilled fields, and selecting the highest unfilled form element on the page. Subsequently, a layout mapping is established between this selected field and the corresponding user-task request value. PyAutoGUI is then generated by the Language Model (LLM) to populate the data field. This process continues iteratively as the system 100 executes the action, extracts the subsequent field to be filled, thereby facilitating dynamic field handling seamlessly.

The system 100 of the present disclosure is further configured to handle scrollable forms. In the context of scrollable forms, the method, and the system 100 of the present disclosure are augmented through an iterative procedure involving incremental webpage/offline application form scrolling by a few pixels. By scrutinizing the frame differential data using vision-based techniques between two screenshots, namely the state before and after scrolling, it is possible to identify the initial field requiring input, mirroring the methodology employed for addressing dynamic fields in the system 100.

The system 100 of the present disclosure is further configured to identify form fields within an application form. In such scenarios, the system 100 implements deep learning based identification of form fields. Language Models (LLMs) currently rely on the HTML source code of web pages to identify field names and their associated types within the visual interface. However, to enhance efficiency and eliminate the dependency on HTML source code, the system 100 leverages deep learning-based computer vision techniques for the automatic identification of field names and their types. This approach involves training a deep neural network specifically designed for field detection and classification. To train this neural network, the system 100 and the method of the present disclosure compiled a diverse dataset comprising various web page layouts. Each layout was meticulously annotated to establish ground truth information, which is traditionally derived from the HTML source code. By training the deep neural network on this dataset, the system 100 enables it to learn and understand the intricate visual relationships between field types and their corresponding visual representations on the web page. As a result, the trained neural network model becomes proficient in recognizing field names and their types solely based on visual cues, eliminating the need for parsing HTML source code.

Dataset Details

To evaluate the effectiveness of integrating vision and large language models (LLMs) in the system 100, an RPA-Dataset was created by the present disclosure. For this dataset, the system 100 identified five distinct applications that exhibit a substantial demand for RPA integration and developed different HTML websites. These applications span ubiquitous enterprise domains, including but not limited to a Conference Attendance System, New Patient Registration, Sales Lead Generation, Customer Complaint Handling, and Passport Registration. Each website had a maximum of five variations in layouts which showcase variations in design and development approaches. Each website layout had five user-task requests. The RPA-Dataset includes the source HTML codes of the application forms, along with ground-truth annotations for tasks such as OCR (Optical Character Recognition), Layout Mapping, filling data fields, and handling complex fields such as dropdowns, date pickers and radio buttons/checkboxes. The preparatory task files for input, along with the corresponding filled ground truth data, were (manually) generated and organized in CSV format. It is to be understood by a person having ordinary skill in the art or person skilled in the art that dataset can be created for offline application form in the same as created and described above, and such dataset creation shall not be construed as limiting the scope of the present disclosure. For sake of brevity, a web application form and dataset creation for the same as been described herein for better understanding of the embodiments and the method of the present disclosure.

Results

Evaluation Metric: To evaluate accuracy of the system 100 in generating navigation workflows and entering correct values into data fields, the following metrics were calculated:

- Text-extraction Accuracy: Measures the accuracy of detecting text fields on the application screen using OCR techniques such as EasyOCR in terms of Character Error Rate (CER) and Word Error Rate (WER).
- Layout Mapping Accuracy: Evaluates the correct association of field names with edit fields, placeholders, and data hints.
- Filled Data Accuracy: Determines the accuracy of filling fields in the application form with correct data values.
- Request Submission Accuracy: This metric measures the success or failure of executing the task request.
- Complex Component Accuracy: Reports the accuracy of filling data in complex fields such as date pickers, dropdowns, radio buttons and checkboxes.
- Task Completion Time: This measures the time (in minutes) taken to complete one specific task-request.

Experimental Results

The system 100 and the method of the present disclosure conducted experiments using OpenAI's LLM GPT-3 API, which is publicly available. The experiments were performed on a GTX 1080 machine with 8 GB GPU Memory. In Table 1, the present disclosure provides performance results of the system 100 on the Conference Attendance System (CAS), a two-page web application with diverse layouts. The text extraction accuracy of OCR is high, with an average CER of 0.015 and WER of 0.086. The present disclosure also compared the accuracy of the rule-based and virtual-grid layout mapping approaches, which show similar and satisfactory results. The minor mistakes in layout mapping can be attributed to certain factors such as closeness of field name and/or hint with incorrect edit-field, cascaded OCR text detection error. These errors were corrected during the initial setup of the method on the system 100 (e.g., a computer system) by administrators. The accuracy of filled data has been 95%, with errors primarily occurring in radio-button and checkbox fields. Finetuning LLMs to handle these fields would significantly improve the accuracy of filled data. The request submission accuracy is 100%, indicating that the system 100 accurately reads the status of executed requests. The average task completion time for CAS is 5.7 minutes, considering its multi-page nature. Variations in task completion time across different layouts and user-tasks are mainly influenced by date picker selections and scrolling within dropdown fields.

TABLE 1

| | | Accuracy | | | | | | Task completion | Complex Component Accuracy | | |
|---|---|---|---|---|---|---|---|---|---|---|---|
| | | | | Layout mapping | | | Request | average time | | | Radio button/ |
| Lay- | Page | OCR | | Rule- | Virtual- | Filled | Sub- | (in | Date | Drop | check- |
| out | no | CER | WER | based | Grid | data | mission | mins) | picker | down | box |
| 1 | 1 | 0.005 | 0.087 | 1.0 | 0.91 | 0.91 | 1.0 | 4.27 | 1.0 | 1.0 | 0.8 |
| | 2 | 0.004 | 0.050 | 1.0 | 1.0 | 1.0 | | | | | |
| 2 | 1 | 0.045 | 0.176 | 0.8 | 0.91 | 0.91 | 1.0 | 6.4 | 1.0 | 1.0 | 0.8 |
| | 2 | 0.004 | 0.025 | 1.0 | 1.0 | 1.0 | | | | | |
| 3 | 1 | 0.037 | 0.154 | 0.9 | 0.91 | 0.91 | 1.0 | 6.7 | 0.933 | 1.0 | 0.8 |
| | 2 | 0.008 | 0.075 | 1.0 | 1.0 | 1.0 | | | | | |
| 4 | 1 | 0.016 | 0.091 | 1.0 | 0.91 | 0.91 | 1.0 | 6.8 | 1.0 | 1.0 | 0.8 |
| | 2 | 0.005 | 0.054 | 1.0 | 1.0 | 1.0 | | | | | |
| 5 | 1 | 0.032 | 0.107 | 1.0 | 0.91 | 0.98 | 1.0 | 4.8 | 1.0 | 1.0 | 1.0 |
| | 2 | 0.005 | 0.027 | 1.0 | 1.0 | 1.0 | | | | | |
| Avergae | | 0.015 | 0.086 | 0.97 | 0.955 | 0.95 | 1.0 | 5.7 | 0.98 | 1.0 | 0.64 |

The system 100 and the method of the present disclosure also report the results for Patient Registration application in Table 2.

TABLE 2

| | | Accuracy | | | | | | Task completion | Complex Component Accuracy | | |
|---|---|---|---|---|---|---|---|---|---|---|---|
| | | | | Layout mapping | | | Request | average time | | | Radio button/ |
| | | OCR | | | | | | | | | |
| Lay-out | Page no | CER | WER | Rule-based | Virtual-Grid | Filled data | Sub-mission | (in mins) | Date picker | Drop down | check-box |
| 1 | 1 | 0.0 | 0.0 | 0.8 | 1.0 | 0.96 | 1.0 | 1.99 | 1.0 | 1.0 | 0.867 |
| 2 | 1 | 0.0 | 0.0 | 1.0 | 0.733 | 0.91 | 1.0 | 1.59 | 1.0 | 1.0 | 0.9 |
| 3 | 1 | 0.0 | 0.0 | 0.8 | 0.812 | 0.96 | 1.0 | 2.29 | 1.0 | 1.0 | 0.8 |
| 4 | 1 | 0.0 | 0.0 | 1.0 | 0.833 | 0.96 | 1.0 | 2.16 | 0.8 | 1.0 | 0.93 |
| 5 | 1 | 0.0 | 0.0 | 1.0 | 1.0 | 0.97 | 1.0 | 1.73 | 1.0 | 1.0 | 1.0 |
| Average | | 0.0 | 0.0 | 0.92 | 0.876 | 0.952 | 1.0 | 1.952 | 0.96 | 1.0 | 0.88 |

Next, average accuracy for each application of the RPA-dataset with different layouts are presented in Table 3. More specifically, the performance of the system 100 across different applications with diverse layouts is presented in Table 3

TABLE 3

| | Accuracy | | | | | | Task completion | Complex Component Accuracy | | |
|---|---|---|---|---|---|---|---|---|---|---|
| | | | Layout mapping | | | Request | average time | | | Radio button/ |
| | OCR | | | | | | | | | |
| Application | CER | WER | Rule-based | Virtual-Grid | Filled data | Sub-mission | (in mins) | Date picker | Drop down | check-box |
| CAS | 0.015 | 0.086 | 0.97 | 0.955 | 0.95 | 1.0 | 5.7 | 0.98 | 1.0 | 0.64 |
| Patient Registration | 0.0 | 0.0 | 0.92 | 0.876 | 0.952 | 1.0 | 1.952 | 0.96 | 1.0 | 0.88 |
| Sales Lead Generation | 0.015 | 0.039 | 0.92 | 0.841 | 0.878 | 1.0 | 1.55 | — | 1.0 | 0.50 |
| Customer Complaint | 0.008 | 0.029 | 0.964 | 1.0 | 0.913 | 1.0 | 1.36 | 1.0 | 1.0 | 0.873 |
| Passport Application | 0.009 | 0.038 | 0.928 | 0.986 | 0.963 | 1.0 | 1.604 | 0.96 | 1.0 | 0.86 |
| Average | 0.009 | 0.038 | 0.94 | 0.931 | 0.933 | 1.0 | 1.433 | 0.985 | 1.0 | 0.75 |

From Table 3, it is evident that the system 100 efficiently automated various applications with an average filled data accuracy of 93.3% and an average time to submit requests of 1.433 minutes. The main challenge lies in accurately selecting options for radio-buttons and checkboxes which can be achieved by fine-tuning the LLMs with such data fields.

Embodiments of the present disclosure provide an AI-driven training-free RPA system that implemented the method of FIG. 2 to autonomously execute user task-requests. By integrating computer vision and generative models such as LLMs, the system 100 automatically generates navigation workflows and adapts to variations in GUIs and applications without human intervention. The experiments on a self-created RPA-dataset, consisting of diverse web applications with varying layouts and user task-requests, showcased the impressive performance of the system 100 of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving, via one or more hardware processors, an input metadata pertaining to an application form, wherein the input metadata comprises a layout mapping of the application form, and a location of the application form;

extracting, by using at least one of one or more vision-based techniques and one or more Large language Models (LLMs) via the one or more hardware processors, one or more field names, and one or more associated field types from the application form;

merging, by using the one or more LLMs via the one or more hardware processors, the one or more field names, and the one or more associated field types with the layout mapping to obtain a mapping list, wherein the mapping list comprises one or more coordinates associated with the one or more field names, and the one or more associated field types; and generating, by using the one or more LLMs via the one or more hardware processors, a navigation workflow using the mapping list and a task-request obtained from a user, wherein the navigation workflow comprises a sequence of actions for execution of one or more micro-level steps comprised therein and the task-request for handling of the one or more associated field types using one or more screenshots associated with the application form via the one or more vision-based techniques.

2. The processor implemented method of claim 1, wherein the mapping list serves as a textual representation of a visual screen associated with the application form for generating the navigation workflow.

3. The processor implemented method of claim 1, wherein the task-request comprises information to be populated in one or more fields associated with the one or more field names of the application form.

4. The processor implemented method of claim 1, further comprising extracting, by using a frame difference technique, one or more feedback messages related to one or more statuses encountered during the execution of the task-request.

5. The processor implemented method of claim 1, wherein the layout mapping is generated using at least one of a rule-based approach, a virtual grid approach, and a demonstration of filling of an application form with relevant information.

6. The processor implemented method of claim 1, wherein accuracy of the layout mapping is determined based on an algorithmic analysis of one or more filled portions and one or more unfilled portions of the application form, and wherein the algorithmic analysis establishes one or more connections between the one or more field names, one or more placeholders, and one or more associated field values.

7. A system, comprising:

a memory storing instructions;

one or more communication interfaces; and one or more hardware processors coupled to the memory via the one or more communication interfaces, wherein the one or more hardware processors are configured by the instructions to:

receive an input metadata pertaining to an application form, wherein the input metadata comprises a layout mapping of the application form, and a location of the application form;

extract, by using at least one of one or more vision-based techniques and one or more Large language Models (LLMs), one or more field names, and one or more associated field types from the application form;

merge, by using the one or more LLMs, the one or more field names, and the one or more associated field types with the layout mapping to obtain a mapping list, wherein the mapping list comprises one or more coordinates associated with the one or more field names, and the one or more associated field types; and generate, by using the one or more LLMs, a navigation workflow using the mapping list and a task-request obtained from a user, wherein the navigation workflow comprises a sequence of actions for execution of one or more micro-level steps comprised therein and the task-request for handling of the one or more associated field types using one or more screenshots associated with the application form via the one or more vision-based techniques.

8. The system of claim 7, wherein the mapping list serves as a textual representation of a visual screen associated with the application form for generating the navigation workflow.

9. The system of claim 7, wherein the task-request comprises information to be populated in one or more fields associated with the one or more field names of the application form.

10. The system of claim 7, wherein the one or more hardware processors are further configured by the instructions to extract, by using a frame difference technique, one or more feedback messages related to one or more statuses encountered during the execution of the task-request.

11. The system of claim 7, wherein the layout mapping is generated using at least one of a rule-based approach, a virtual grid approach, and a demonstration of filling of an application form with relevant information.

12. The system of claim 7, wherein accuracy of the layout mapping is determined based on an algorithmic analysis of one or more filled portions and one or more unfilled portions of the application form, and wherein the algorithmic analysis establishes one or more connections between the one or more field names, one or more placeholders, and one or more associated field values.

13. One or more non-transitory machine-readable information storage mediums comprising one or more instructions which when executed by one or more hardware processors cause:

receiving an input metadata pertaining to an application form, wherein the input metadata comprises a layout mapping of the application form, and a location of the application form;

extracting, by using at least one of one or more vision-based techniques and one or more Large language Models (LLMs), one or more field names, and one or more associated field types from the application form;

merging, by using the one or more LLMs, the one or more field names, and the one or more associated field types with the layout mapping to obtain a mapping list, wherein the mapping list comprises one or more coordinates associated with the one or more field names, and the one or more associated field types; and generating, by using the one or more LLMs, a navigation workflow using the mapping list and a task-request obtained from a user, wherein the navigation workflow comprises a sequence of actions for execution of one or more micro-level steps comprised therein and the task-request for handling of the one or more associated field types using one or more screenshots associated with the application form via the one or more vision-based techniques.

14. The one or more non-transitory machine-readable information storage mediums of claim 13, wherein the mapping list serves as a textual representation of a visual screen associated with the application form for generating the navigation workflow.

15. The one or more non-transitory machine-readable information storage mediums of claim 13, wherein the task-request comprises information to be populated in one or more fields associated with the one or more field names of the application form.

16. The one or more non-transitory machine-readable information storage mediums of claim 13, wherein the one or more instructions which when executed by the one or more hardware processors further cause extracting, by using a frame difference technique, one or more feedback messages related to one or more statuses encountered during the execution of the task-request.

17. The one or more non-transitory machine-readable information storage mediums of claim 13, wherein the layout mapping is generated using at least one of a rule-based approach, a virtual grid approach, and a demonstration of filling of an application form with relevant information.

18. The one or more non-transitory machine-readable information storage mediums of claim 13, wherein accuracy of the layout mapping is determined based on an algorithmic analysis of one or more filled portions and one or more unfilled portions of the application form, and wherein the algorithmic analysis establishes one or more connections between the one or more field names, one or more placeholders, and one or more associated field values.

* * * * *